(12) United States Patent
Gallarda

(10) Patent No.: US 6,668,913 B2
(45) Date of Patent: Dec. 30, 2003

(54) LIQUID-GAS MANIFOLD FOR A MATTER AND/OR HEAT EXCHANGE COLUMN, AND COLUMN USING SUCH A MANIFOLD

(75) Inventor: Jean Gallarda, Joinville le Pont (FR)

(73) Assignee: L'Air Liquide-Societe Anonyme a Directoire et Conseil de Surveillance pour l'Etude l'Exploitation des Procedes Georges Claude, Paris Cedex (FR)

( * ) Notice: Subject to any disclaimer, the term of this patent is extended or adjusted under 35 U.S.C. 154(b) by 11 days.

(21) Appl. No.: 09/827,930

(22) Filed: Apr. 9, 2001

(65) Prior Publication Data
US 2001/0027858 A1 Oct. 11, 2001

(30) Foreign Application Priority Data
Apr. 7, 2000 (FR) .............................. 00 04484

(51) Int. Cl.[7] .................................. F28B 1/00
(52) U.S. Cl. ................. 165/110; 165/115; 165/174
(58) Field of Search ................ 165/173, 178, 165/104.34, 143, 144, 145

(56) References Cited

U.S. PATENT DOCUMENTS

| | | | |
|---|---|---|---|
| 3,070,360 A | | 12/1962 | Rafferty et al. |
| 3,668,881 A | * | 6/1972 | Thibault et al. ............. 62/55.5 |
| 3,744,440 A | * | 7/1973 | Gardner ..................... 110/18 R |
| 4,816,191 A | | 3/1989 | Berven et al. |
| 5,478,535 A | * | 12/1995 | Fierz et al. ................. 422/205 |
| 5,692,394 A | * | 12/1997 | Ozaki et al. .................. 62/509 |

FOREIGN PATENT DOCUMENTS

| | | |
|---|---|---|
| CH | 680 908 | 12/1992 |
| DE | 1 501 731 | 12/1969 |

* cited by examiner

*Primary Examiner*—Henry Bennett
*Assistant Examiner*—Nihir Patel
(74) *Attorney, Agent, or Firm*—Young & Thompson

(57) ABSTRACT

A liquid-gas manifold includes a single container of roughly cylindrical overall external shape, designed to define an annular space between a side wall of the container and an interior wall of a heat exchange column. The container also has a perforated bottom and a connection between the container and the interior wall of the column. Gases from the annular space are transferred to a space located above the container.

15 Claims, 4 Drawing Sheets

LIQUID-GAS MANIFOLD FOR A MATTER AND/OR HEAT EXCHANGE COLUMN, AND COLUMN USING SUCH A MANIFOLD

BACKGROUND OF THE INVENTION

The present invention relates to the field of matter and/or heat exchange columns, particularly columns for scrubbing or distilling gas mixtures. More specifically, it relates to manifolds that collect the liquid descending down inside these columns and distribute it over the upper surface of the active zone of the column that they overhang.

During the processes of separating the various constituents of a gaseous mixture inside a column, it may be necessary to extract the gases ascending up inside this column so as to subject them to a treatment such a heat exchange operation intended to return them to a given temperature. This is the case in particular when scrubbing the ascending gases inside the column using a liquid constituent. As an example of such a method, mention may be made of the operation of separating hydrogen from mixtures containing hydrogen, CO and methane which are obtained by the reforming of methane with steam. During the separation operation aimed at collecting pure hydrogen at the top of the column, the hydrogen may be scrubbed with liquid methane that is introduced into the upper part of the column.

For such a scrubbing operation to be as effective as possible, a temperature as close as possible to −180° C. needs to be maintained throughout the column, even though the scrubbing is exothermal. For this purpose, it is a known practice to extract the ascending gases at various points on the column, to pass them through a heat exchanger aimed at cooling them, and to reintroduce them into the column at a level above the level at which they were tapped. The drop in temperature of the collected gases after they have passed through the exchanger causes the less volatile compounds of the gaseous mixture to condense. This condensed liquid is collected by liquid traps which pour it out into manifold containers. These manifold containers have a perforated bottom which allows them to distribute the liquid they contain over the upper surface of an active zone, such as a packing, that they overhang.

These liquid trap-manifold assemblies constitute relatively bulky members, the overall height of which can be as much as a few meters. As the column generally has a number of packings and stages where the ascending gases are extracted, cooled and then reintroduced into the column, this construction of necessity entails building very tall columns, therefore having a high cost price. In addition, these liquid trap-manifold assemblies are of complex structure and are in themselves costly to produce.

SUMMARY OF THE INVENTION

The object of the invention is to provide users of matter and/or heat exchange columns with liquid-gas manifolds which are appreciably less complicated than the existing manifolds, so as to allow a reduction in the cost of construction of the column, and possibly in its overall height.

To this end, a subject of the invention is a liquid-gas manifold for a matter and/or heat exchange column, characterized in that it comprises a single container of roughly cylindrical overall external shape, designed to define an annular space between its side wall and the interior wall of the said column and having a perforated bottom, means for connecting the container to the interior wall of the column, and means allowing the gases to be transferred from the said annular space to the space located above the container.

The latter means may consist of openings formed in an upper lip of the said manifold, or in the side wall of the container.

As a preference, the container has a narrowing of its internal cross section in its central part.

Another subject of the invention is a matter and/or heat exchange column comprising at least one liquid-gas manifold collecting the descending liquid to distribute it to an active zone that it overhangs, characterized in that the said manifold is in accordance with the type described above.

According to one variant of the invention, the said means allowing the transfer of the ascending gases from the said annular space into the space located above the container comprise a pipe for tapping the ascending gases from the said annular space and a pipe for reintroducing the said gases into the column above the container.

According to another variant of the invention, openings are made in an upper lip of the container, and open into an heat exchanger incorporated into the said column.

As will have been appreciated, the invention consists in incorporating into the liquid-gas manifold, a single container of cylindrical overall shape with a perforated bottom, with which no separate liquid trap is associated. According to the various variants of the invention, the container collaborates with the wall of the column to send the ascending gases to undergo a treatment in apparatus located outside or inside the column, or allows the ascending gases to pass through.

BRIEF DESCRIPTION OF THE DRAWINGS

The invention will be better understood from reading the description which follows, which is given with reference to the following appended figures.

DETAILED DESCRIPTION OF THE PREFERRED EMBODIMENTS

Figure 1:
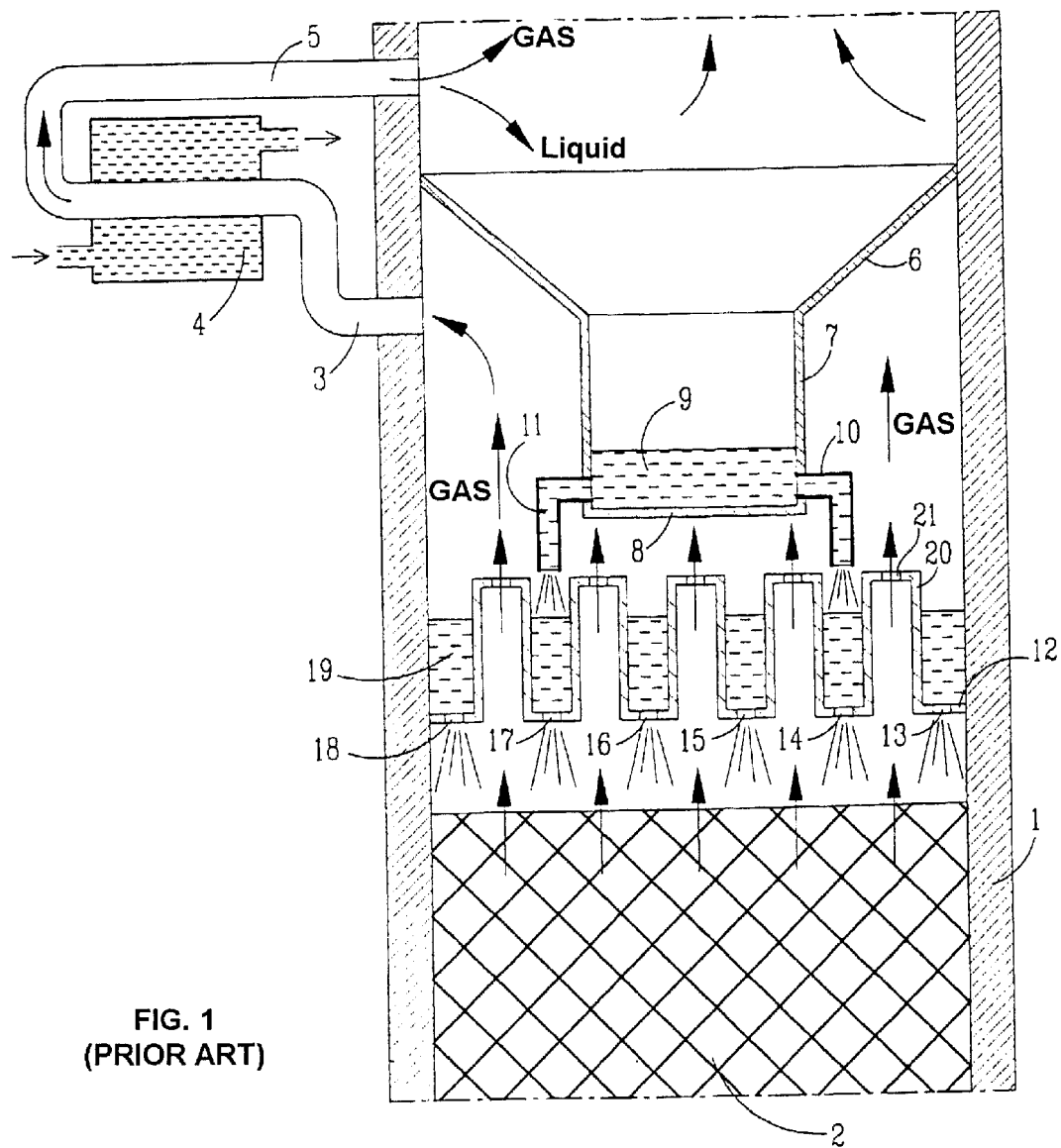
FIG. 1 which depicts, in longitudinal section, one portion of a gaseous mixture separation column of the prior art.

The portion of gaseous mixture separation column according to the prior art which is depicted in FIG. 1 comprises a cylindrical wall or barrel 1. It is filled over a portion of its height with a packing 2 constituting an active zone of the column. In the installation given by way of example, the gases leaving the packing 2 are at a temperature higher than the desirable temperature for performing a gas scrubbing operation with the greatest possible efficiency. This is the case, for example, when the column has to treat a hydrogen/CO/methane mixture resulting from a reaction for the reforming of methane with steam, which the column is supposed to separate into pure gaseous hydrogen, on the one hand, collected at the top of the column, and a liquid CO/methane mixture, on the other hand, collected at the bottom of the column. For this purpose, it is often desirable to carry out an operation of scrubbing the ascending gaseous mixture with liquid methane introduced at the top of the column. For this scrubbing operation to have maximum effectiveness, it needs to take place at a temperature close to −180° C. As the gases leave the packing 2 at a temperature slightly higher than the desired temperature, these gases are tapped off using a pipe 3 tapped into the wall 1 of the column. The gases thus collected are sent to a heat exchanger 4 where they are cooled (for example using liquid CO). Once the temperature of the gases has been brought back down to −180° C., the gases and the liquid which has condensed during the heat transfer operation are reintroduced into the column by a pipe 5. The latter opens into the column at a level higher than the level at which the gas extraction pipe 3 was located. The liquid fraction of the matter reintroduced into the column is collected by a liquid trap 6. This liquid trap 6 is in the form of a funnel, the circumference of the upper part of which is secured to the periphery of the internal wall 1 of the column at a level located between that of the gas tapping pipe 3 and that of the pipe 5 for reintroducing the gases and condensed liquid into the column. The funnel-shaped part of the liquid trap 6 opens onto a cylindrical portion 7 equipped with a solid bottom 8. Liquid 9 can thus accumulate in the bottom of the liquid trap 6. Pipes 10, 11 allow this liquid 9 to be introduced into a manifold 12 located under the liquid trap 6. This manifold 12 may conventionally be in the form of a container of complex shape, the bottom of which has perforations 13, 14, 15, 16, 17, 18. The liquid 19 present in the manifold 12 flows through the perforations 13, 14, 15, 16, 17, 18 of said manifold towards the packing 2. The heads of liquid 9, 19 present in the liquid trap 6 and in the manifold 12 correspond to the pressure drops of the gas between the upper and lower levels of these liquids. The bottom of the manifold 12 is also equipped with domes 20 which have perforations 21 allowing the ascending gases leaving the packing 2 to pass through the manifold 12.

Figure 2:
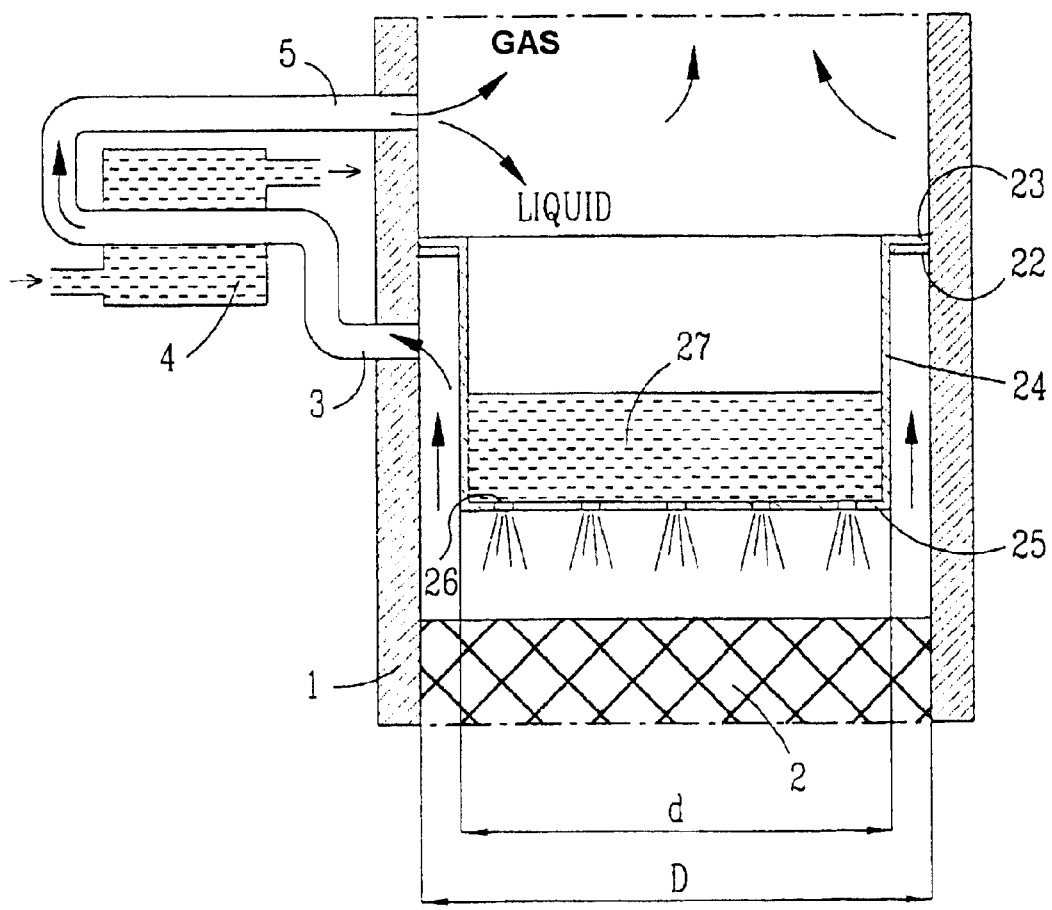
FIG. 2 which depicts, in longitudinal section, one portion of a gaseous mixture separation column equipped with a liquid-gas manifold according to the invention.

The separation column according to the invention and depicted in FIG. 2 comprises, placed between the respective levels of the gas tapping pipe 3 and the pipe 5 for reintroducing the gases and the condensed liquid, a support 22 which runs around the inside of the wall 1 of the column around its entire circumference. Resting on this support 22 is an upper lip 23 of a container 24 which forms part of a liquid-gas manifold according to the invention. This container 24 has a cylindrical overall shape and its bottom 25 has perforations 26. Its outside diameter d is smaller than the inside diameter D of the column. These perforations 26 distribute the liquid 27 present in the container 24 over the upper surface of the packing 2 which the container 24 overhangs. The ascending gases leaving the packing 2 pass through the annular space defined, on the one hand, by the internal wall 1 of the column and, on the other hand, by the external wall of the container 24. They are directed towards the gas tapping pipe 3, because the support 22 on which the upper lip 23 of the container 24 rests delimits, in collaboration with the side wall of the container 24, a zone which is impervious to the ascending gases. As in the prior art, these ascending gases pass through a heat exchanger 4 which drops their temperature to the desired level. After they have been reintroduced into the column by the pipe 5, the cooled gases continue to rise, while the condensed liquid and the scrubbing liquid flow into the container 24, without a separate liquid trap or any other member comparable to the liquid trap 6 of FIG. 1 being provided. The head of liquid 27 present in the container 24 corresponds to the pressure drop of the gases between the upstream and downstream sides of the container 24.

By comparison with the configuration according to the prior art and illustrated in FIG. 1, the exemplary configuration according to the invention in FIG. 2 is about 1 m less tall, therefore an appreciably reduced height. This makes it possible to give the column height which is smaller than it would usually be, this being all the more advantageous if the stages of extracting, cooling and reintroducing the gases into the column are numerous.

Figure 3:
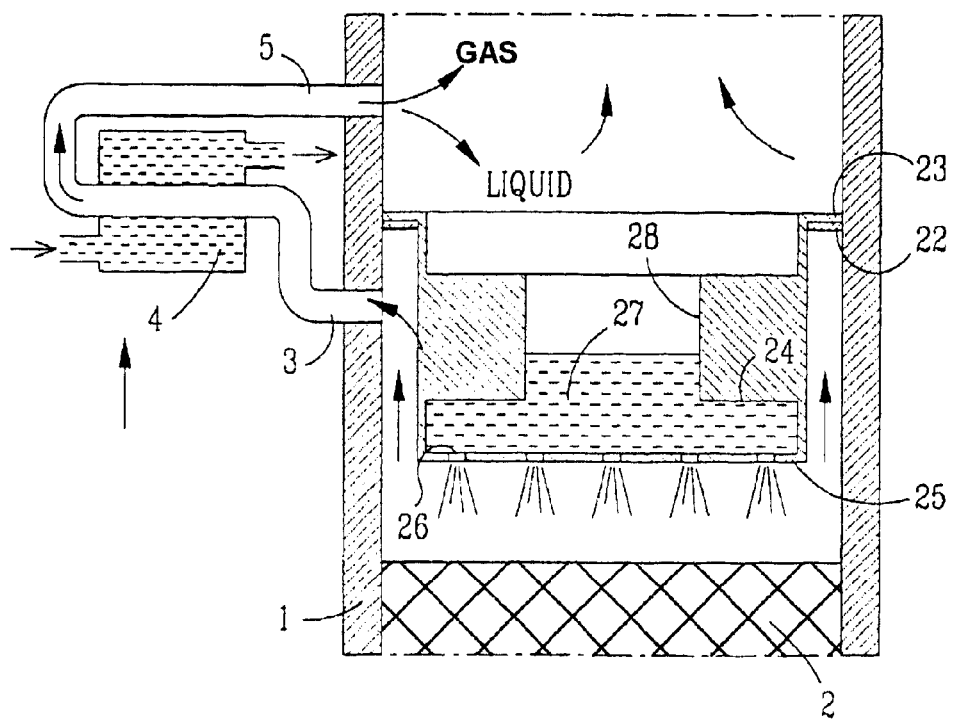
FIG. 3 which depicts, in longitudinal section, one portion of a gaseous mixture separation column equipped with a liquid-gas manifold according to a variant of the invention.

As a variant, as depicted in FIG. 3, the container 24 may have a narrowing 28 of its inside diameter in its central part. The amount of liquid 27 retained in the container 24 can thus be reduced. To make the liquid 27 easier to collect, it is also possible to envisage giving the container 24 the shape of a funnel above the narrowing 28 of its cross section.

Figure 4:
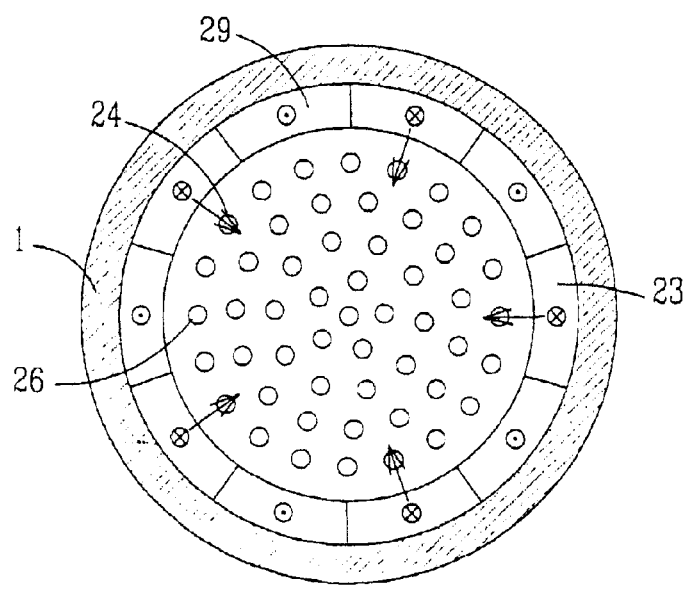
FIG. 4 which depicts, from above, a liquid-gas manifold according to another variant of the invention.

As a variant, as depicted in FIG. 4, the upper lips 23 of the containers 24 may have openings 29. In collaboration with similar openings made in the supports 22, these openings 29 allow the gases to rise up inside the column. These openings 29 may thus open into heat exchangers similar in their function to the exchanger 4 of FIGS. 1 to 3, but incorporated into the wall 1 of the column. Once the gases have passed through these exchangers and have been reintroduced into the column, the liquid which has condensed drops back down to be collected in the containers 24.

Figure 5:
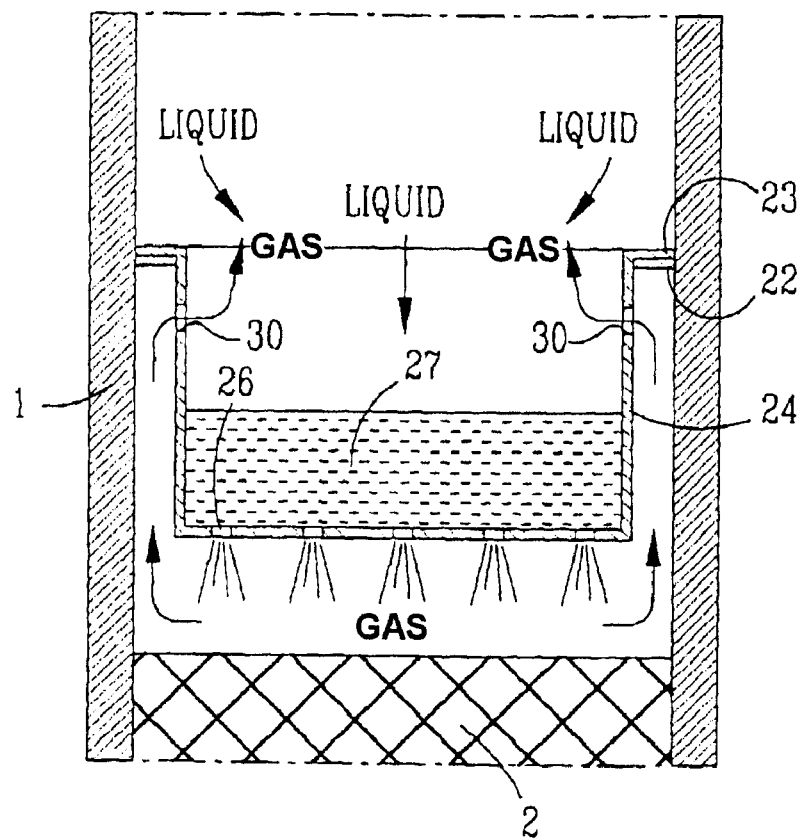
FIG. 5 which depicts, in longitudinal section, a portion of a gaseous mixture separation column equipped with a liquid-gas manifold according to another variant of the invention.

The manifolds according to the invention may also be used in scenarios where there is no desire to cause the ascending gases to undergo a particular treatment but where there is simply a desire to distribute the descending liquid uniformly over the surface of the packing (or, in general, the active zone) that the manifold overhangs. For this purpose, it is possible to use the variant of the container 24 which is depicted in FIG. 5. It is installed in a column, the wall 1 of which has no means for causing the ascending gases to be subjected to a particular treatment, whether outside or inside the column. As in the variants depicted in FIGS. 2 and 3, the annular space between the container 24 and the wall 1 of the column is closed off at its upper end by a lip 22 secured to the wall 1 of the column collaborating with an upper lip 23 of the container, both being devoid of openings through which the ascending gases could pass. By contrast, such openings 30 are to be found on the side wall of the container 24. In this way, all the condensed liquid descending from the upper stages of the column passes through the container 24, and does not impede the ascending movement of the gases in the annular space.

As a variant, the orifices 30 could be made in the lip 23.

What is claimed is:

1. A liquid-gas distributor in one of a matter and a heat exchange column, comprising:

a substantially cylindrical container for containing a liquid and defining an annular space between a side wall of the container and an interior wall of a heat exchange column, and having a perforated bottom for distributing the liquid to a lower region of the heat exchange column;

means for connecting the container to the interior wall of the heat exchange column; and means for allowing gases to be transferred from the annular space to a space located above the container, wherein a diameter of said perforated bottom is greater than an internal radius of said heat exchange column.

2. A liquid-gas distributor according to claim 1, wherein an internal cross-section of the container is narrower in a central part of the container than a top and a bottom of the container.

3. A liquid-gas distributor according to claim 1,
wherein the means for connecting the container to the interior wall of the heat exchange column comprises a lip on a top of the container, and
wherein the means for allowing gases to be transferred are a plurality of openings formed in the lip.

4. A liquid-gas distributor according to claim 1, wherein the means for allowing gases to be transferred are openings formed in the side wall of the container.

5. At least one of a matter and a heat exchange column, comprising at least one liquid-gas distributor according to claim 1, and an active zone beneath said at least one liquid-gas distributor,
wherein said at least one liquid-gas distributor collects liquid descending down the interior wall of the heat exchange column to distribute the liquid to said active zone.

6. The column according to claim 5, wherein the means for allowing gases to be transferred comprise a first pipe for tapping gases ascending from said annular space and a second pipe for reintroducing said gases into the heat exchange column, above the container.

7. At least one of a matter and a heat exchange column, comprising a liquid-gas distributor according to claim 3, and a heat exchanger, said plural openings opening into said heat exchanger.

8. A liquid-gas distributor for one of a matter and a heat exchange column, comprising:
only one container for a liquid having a plurality of perforations in a bottom of said container for directly distributing the liquid to an active zone of a heat exchange column;
a substantially annular flange connecting a top of said container to an inside wall of the heat exchange column, said top of said container being open.

9. The distributor according to claim 8, wherein a sidewall of the container is perforated above a level of the liquid for allowing a gas to pass.

10. A heat exchange column, comprising:
an active zone that allows a gaseous mixture to pass therethrough;
a container for a liquid having a plurality of perforations in a bottom of said container for directly distributing the liquid to said active zone, and a lip at a top of said container;
a flange on an inside wall of the column, said lip resting on said flange so that said flange supports said container;
a heat exchanger for cooling at least part of said gaseous mixture; and
a pipe connecting said heat exchanger to said column.

11. The column according to claim 10, wherein an inlet of the pipe is below the flange and an outlet of the pipe is above the flange.

12. The column according to claim 10, wherein the flange and the lip are perforated.

13. The liquid-gas distributor according to claim 1, wherein the container has two side-walls and a bottom surface, said bottom surface being said perforated bottom.

14. The liquid-gas distributor according to claim 1, wherein the container has two side-walls and wherein a single bath of liquid is confined between said two side-walls and a perforated bottom surface of said container.

15. The liquid-gas distributor according to claim 1, wherein the container has a constant internal radius throughout a height of said container.

* * * * *